US005415723A

United States Patent [19]

Rodriguez

[11] Patent Number: 5,415,723

[45] Date of Patent: May 16, 1995

[54] AWARD MOUNTER

[76] Inventor: Ivan J. Rodriguez, 44-110 Kahinani Way, Kaneohe, Hi. 96744

[21] Appl. No.: 220,447

[22] Filed: Mar. 30, 1994

[51] Int. Cl.$^6$ .............................................. B32B 31/00

[52] U.S. Cl. .................................... 156/556; 156/228; 156/580; 156/581

[58] Field of Search ................. 156/66, 228, 250, 261, 156/538, 556, 580, 581; 40/1.5; 29/160.6, 464, 465, 466, 467, 281.1, 281.4, 281.5

[56] References Cited

U.S. PATENT DOCUMENTS

| | | | |
|---|---|---|---|
| 2,460,168 | 1/1949 | Caserta | 156/228 X |
| 2,674,559 | 4/1954 | Zobel | 156/66 |
| 3,683,461 | 8/1972 | Weidemann | 24/73 HS |
| 3,936,923 | 2/1976 | Cantor | 29/408 |
| 4,555,840 | 12/1985 | Nakamura | 29/465 |
| 4,583,287 | 4/1986 | McDevitt et al. | 29/741 |
| 4,741,796 | 5/1988 | Althaus et al. | 156/272.4 |
| 5,194,108 | 3/1993 | White, Jr. et al. | 156/71 |

*Primary Examiner*—James J. Engel
*Attorney, Agent, or Firm*—Richard C. Litman

[57] ABSTRACT

A die assembly for holding a bas-relief military decoration to a ribbon while gluing the two together. The die assembly has mating top and bottom halves, and sandwiches both the ribbon and the decoration therewithin. The decoration is placed in a die which conforms to the front, or visible side, so as to hold the same immovably. The die is held in a recess formed in the bottom half. The ribbon is placed in a slide groove located in the top half. Glue is applied to the exposed rear surface of the decoration. The two halves are then pressed together, and the ribbon and decoration are also pressed together, and united. Precise alignment of the decoration and ribbon, and between die assembly upper and lower halves, is provided by cooperating guides formed in the die assembly. A hole is formed in the top half, to accommodate prongs formed in the decoration. This enables retention of these prongs, rather than requiring bending them back or removing them prior to mounting the decoration. In a preferred embodiment, a separate cap member provides a storage chamber. Bottom half, top half, and the cap member frictionally interfit by cooperating channels and flanges, so that the die assembly forms a unit, as when fit together for storage.

16 Claims, 2 Drawing Sheets

AWARD MOUNTER

BACKGROUND OF THE INVENTION

1. Field of the Invention

The present invention relates to apparatus for quickly and neatly fastening a military decoration to an associated ribbon, so that the latter is rendered presentable for display upon a uniform or the like.

2. Description of the Prior Art

Military decorations must frequently be worn and displayed by military personnel. The decorations, which comprise metal castings which bear bas-relief ornamentation or other indicia, are mounted to a ribbon, and are supported thereon. The task of fixing a metal decoration to its ribbon requires dextrous manipulation of both decoration and ribbon, and frequently the mounting is not achieved in a satisfactory manner. This is because the decoration must be aligned with the ribbon and held in close proximity thereto. Any failure of alignment or proximal retention causes the decoration to sag or tilt, which presents a visually discordant impression, and is unacceptable.

Decorations are typically provided with prongs for piercing the ribbon. After piercing, the prongs must be bent so as to securely engage the ribbon, while remaining aligned and in close proximity. These prongs are generally not formed to have the necessary strength to result in a satisfactory installation.

A serviceman may resort to breaking off the prongs and adhering the decoration to the ribbon, as by gluing. This is more difficult than is apparent, since the decoration is usually less than one quarter inch (6 mm) in height and considerably less thick, and is not easily manipulated. Equipment for expediting the mounting process by gluing is not readily available, and a serviceman must frequently make do with tweezers or similar implements.

It is easy to smear the adhesive on the ribbon, which impairs the appearance to an unacceptable degree. Frequently, the task must be repeated a number of times before success is attained.

The prior art has not attempted to address the precise problem stated above. However, devices for mounting preformed, substantially flat objects are shown in the prior art.

Apparatus and method for installing a slide fastener to a garment are disclosed in U.S. Pat. No. 3,936,923, issued to Charles E. Cantor on Feb. 10, 1976. This invention addresses some aspects of the present invention. A die has recesses for cooperating with the contours of the slide fastener and garment fabric. The die is pressed against a supporting block, the garment and slide fastener being sandwiched therebetween. The block has no structural features for positioning or holding the garment beyond a plurality of upwardly projecting pins. There is no structure integral with the die or its supporting block assuring a precise, overlying relation therebetween.

U.S. Pat. No. 4,583,287, issued to John E. McDevitt et al. on Apr. 22, 1986, discloses a tool for installing and removing integrated circuits. The tool must hold both the integrated circuit assembly and an associated circuit board in precise relation to one another, then raise and lower the integrated circuit.

An arrangement for bonding a first element to a second element is shown in U.S. Pat. No. 4,741,796, issued to Hans Althaus et al. on May 3, 1988. The arrangement shown herein includes soldering and other bonding or fusion of metals, and manipulation of heat emitting apparatus.

A tool for mounting an adhesive backed object to a supporting surface is shown in U.S. Pat. No. 5,194,108, issued to Frederick E. White, Jr., et al. on Mar. 16, 1993. The tool is not able to surround the supporting surface, and locates the object by penetrating the surface. A preferred application of this invention is to install a cable tie to a motor vehicle wall or panel. The cable tie includes an adhesive backed mounting surface, which is pressed against the vehicle. The structure and operation of the tool presented in this patent differ significantly from those of the present invention.

U.S. Pat. No. 3,683,461, issued to Rudolf Weidemann on Aug. 15, 1972, describes an arrangement for securing a bas-relief object to a base surface. The displayed bas-relief object attaches to an intermediate support member by a snap fastener including a peg formed in the intermediate member, and a socket located in a boss or standoff formed in the displayed member. The intermediate member includes a flat rear surface which is adhered to another object.

None of the above inventions and patents, taken either singly or in combination, is seen to describe the instant invention as claimed.

SUMMARY OF THE INVENTION

The present invention provides a tool or jig formed in complementary, mating halves, which hold both a military campaign ribbon or the like, and a bas-relief decoration or the like in precise, fixed, overlying relation. The decoration is held in a cooperating die which is configured to conform precisely thereto, and the die is held in the bottom half. The decoration is supported face down, with the rear surface exposed. Glue is applied to the rear surface.

A ribbon is placed in a track formed in the top half of the tool. The track is sufficiently narrow to retain the ribbon therewithin. The top half of the tool is then aligned with and pressed against the lower half. The decoration is forced against the ribbon in precisely maintained, predetermined relation position, and bonds thereto.

The procedure discussed above is employed in the case of decorations having no mounting prongs, or wherein such prongs have been removed. As some people prefer to retain these prongs, but still adhere the decoration by adhesive, provision is made for gluing the decoration to the ribbon while retaining the prong. A relief hole is formed in the top half of the tool, for receiving this prong. The prong pierces the ribbon, occupies space provided by the relief, and adhesive bonding is performed as previously discussed.

The halves of the tool are compact, and designed to interfit efficiently. When mated, they form a rectangular cube. The configuration of the tool assures maximal strength for the size thereof, and promotes ready use. Guides built into the halves assure that alignment is always true at the point of abutment.

Indicia are provided to locate the ribbon appropriately, as for centering the decoration, or even for spacing the decoration from center, as may be required when mounting more than one decoration on one ribbon.

In a preferred embodiment, the tool has cooperating grooves and flanges enabling top and bottom parts to interfit, and be held together by friction. In like manner, a storage chamber is created by providing a hollow cap member which interfits with the top part, and is retained by friction.

Accordingly, it is a principal object of the invention to provide a tool which holds a campaign ribbon and a military decoration in precise, square relationship, and forces one against the other.

It is another object of the invention to provide a tool which immovably holds a decoration by closely cooperating fit, and which slidably holds a ribbon by friction.

It is a further object of the invention to provide indicia for locating a ribbon relative to a decoration in a preferred location.

Still another object of the invention is to provide a tool which is compact and strong.

It is yet a further object to enable the sections of the tool to interfit for storage as a unit, and to be retained in this configuration by friction.

Another object of the invention is to provide a storage compartment for holding a plurality of small components, such as dies for cooperating with selected decorations.

An additional object of the invention is to provide a tool which readily indicates the method of use by its configuration.

It is again an object of the invention to provide a tool which is readily manufactured.

Yet another object of the invention is to provide a tool which assumes a cubical configuration when assembled.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figures 1, 2:
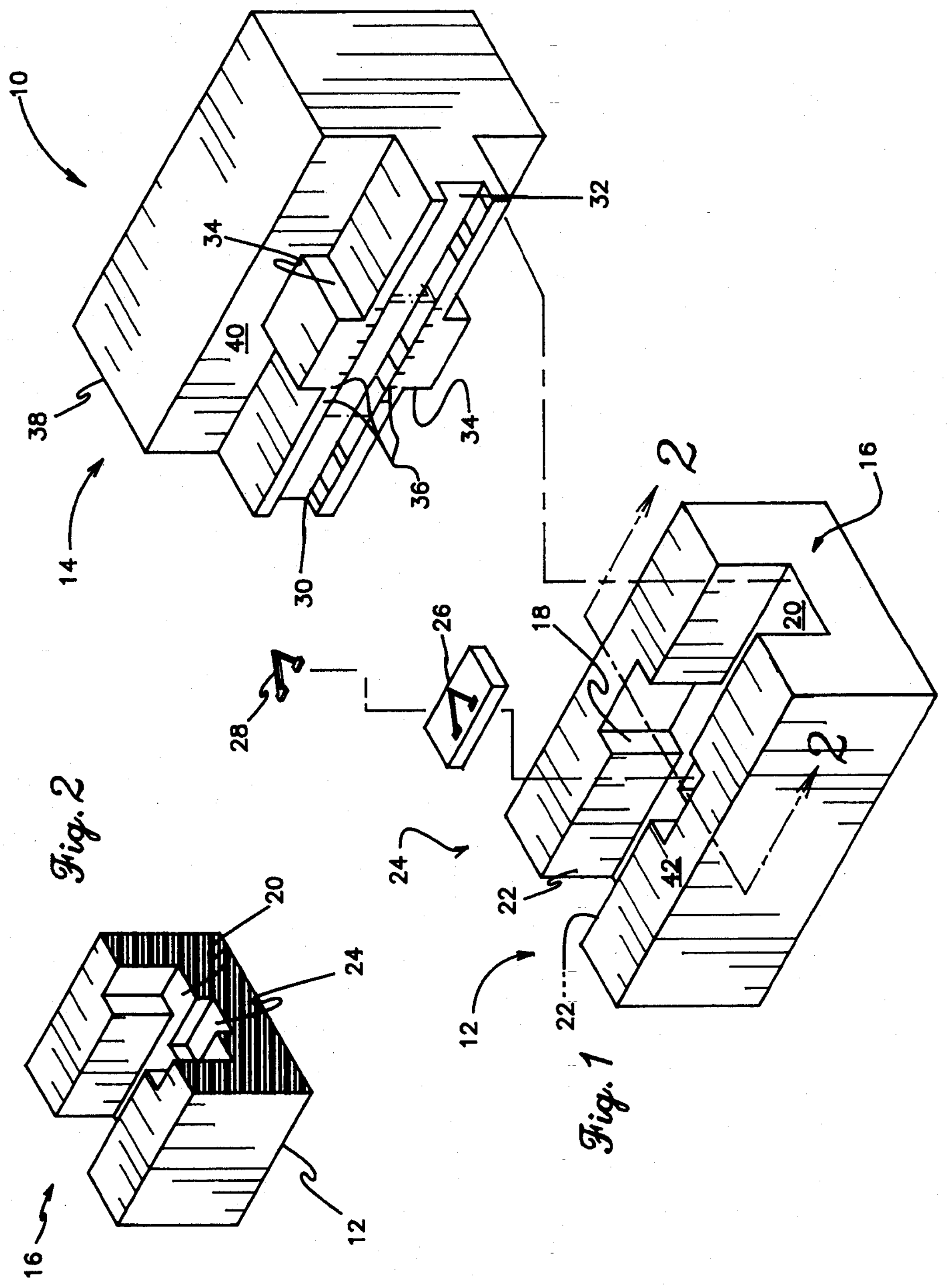
FIG. 1 is an environmental, exploded, perspective view of the invention.
FIG. 2 is a perspective view of the bottom half or portion of the invention, broken away to reveal internal detail, and drawn to reduced scale.

Turning now to FIG. 1 of the drawings, the novel tool 10 is seen to have a lower support block 12 and an upper ribbon holder 14. Support block 12 includes a channel 16 extending longitudinally therealong. At the center, channel 16 includes a widened portion having exposed, perpendicular surfaces. This widened portion serves as an alignment opening 18, which will cooperate with upper ribbon holder 14 in a manner to be described hereinafter.

Channel 16 has a planar floor surface 20 and vertical lateral surfaces 22. A recess 24 for accepting a die is formed in channel 16, and extends below floor 20. Recess 24 is seen clearly in FIG. 2.

Again referring to FIG. 1, a die 26 is configured and dimensioned to fit precisely into recess 24, and to conform to or cooperate with the frontal, or visible surface of a bas-relief decoration, or similar object when that object is placed face down therein. Die 26 thus is constrained against sliding or other wise moving out of position, once placed in recess 24, and in turn constrains a decoration 28 placed therein against moving or dislodging. The rear surface of decoration 28 is upwardly exposed, and is coated lightly with a suitable adhesive (not shown).

The complementary, mating ribbon holder 14 has a downwardly projecting member 30 which defines a square groove or ribbon track 32. Ribbon track 32 is of a width of less magnitude than conventional and standard military campaign ribbons issued by the U.S. Department of Defense, and thus grips such a ribbon by friction.

Projecting member 30 includes downwardly facing projections 34 which are alignable with and cooperate with alignment opening 18. When ribbon holder 14 is mated with support block 12, parallel and close fitting surfaces of alignment opening 18 and projections 34 assure square, precise location of decoration 28 with respect to its associated ribbon (not shown).

Indicia 36 are placed on ribbon track 32, to assist a user to gauge by eye a desired location of the ribbon. Normally, the ribbon is centered in ribbon track 32, but may be off center when more than one decoration will be adhered thereto.

The configuration of tool 10 includes the following advantages. Channel 16 and alignment opening 18 form a common, open partial chamber. In like manner, projecting member 30 and alignment projections 34 are joined, or formed integrally. This arrangement requires minimal wall surfaces and joints to be manufactured or machined in both the finished tool 10 and in molds required to form the same. Walls are also of maximal thickness, so that they have maximum strength. Also, grouping channel 16 and alignment opening 18, and their male counterparts 30,34 enables the most economical and efficient use of space. Channel 16 extends longitudinally along support block 12. Thus, the volume occupied by tool 10 is minimized.

Ribbon holder 14 is seen to comprise a square walled body 38 having a central, planar lower surface 40 below which projecting member 30 and alignment projections extend. Surface 40 is central with respect to its location demarcating the transition between body 38 and projecting member 30. This surface 40 abuts a corresponding uppermost planar surface 42 formed on support block 12, when these two components 12,14 are pressed together. Tool 10 may thus be compactly configured for storage.

Figure 3:
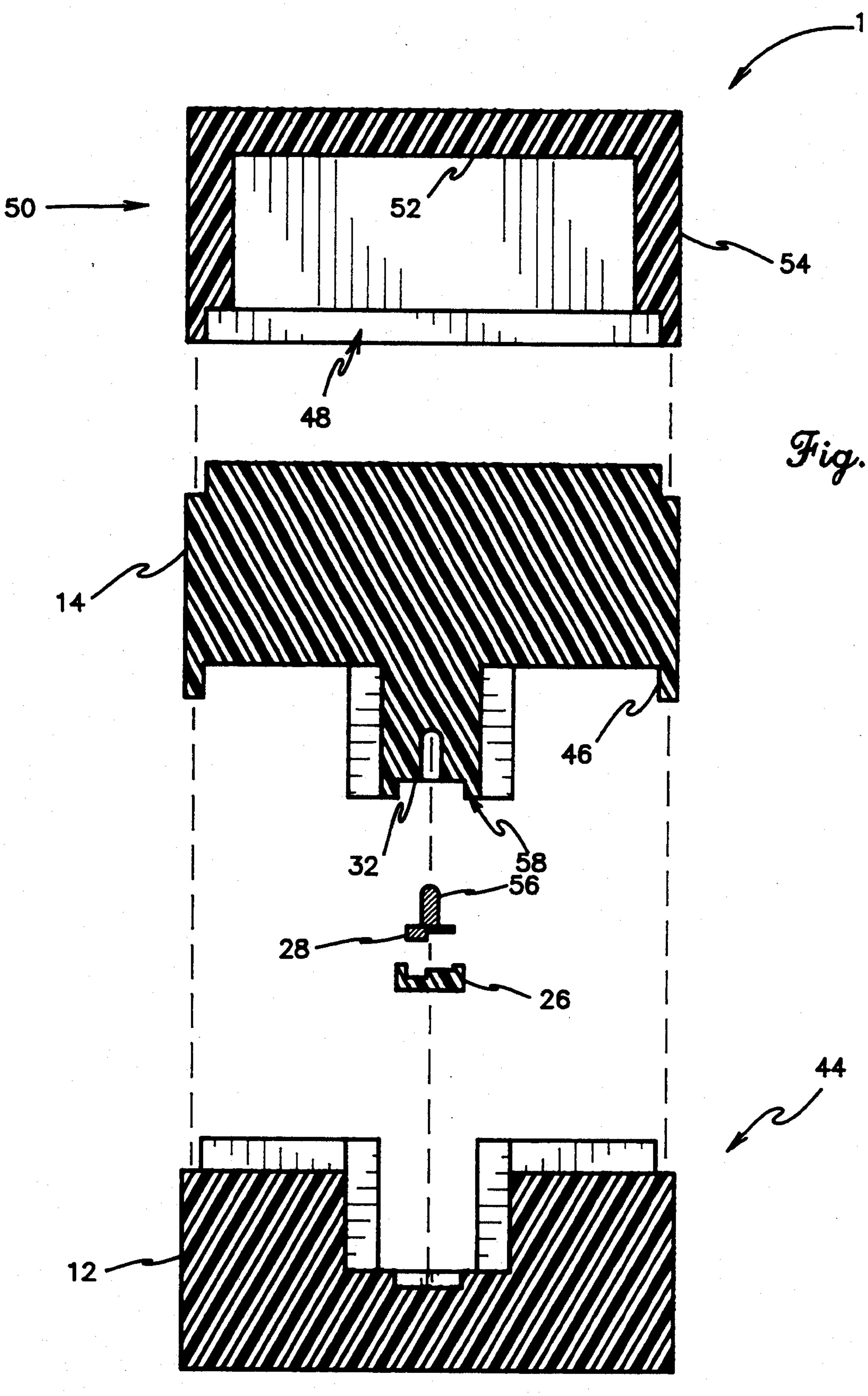
FIG. 3 is a side cross sectional view of a preferred embodiment of the invention, showing grooves and shoulders enabling frictional interfit, and also showing a storage chamber.

FIG. 3 illustrates a preferred embodiment of tool 10, which furthers practicality of storing the same, and of storing therewithin a collection of dies 26. First, support block 12 and ribbon holder 14 include, respectively, a first groove forming a shoulder 44, and a downwardly extending short wall 46. Wall 46 interfits so as to abut shoulder 44, so that support block 12 and ribbon holder 14 interfit and are so retained by friction.

A chamber 48 for storing additional dies 26 is provided by including a hollow cap member 50. Cap member 50 has a floor panel 52 and walls 54. Cap member 50 and ribbon holder 14 include a second short wall 46 and second shoulder 44, so that cap member 50 assembles to ribbon holder 14 in the same manner as ribbon holder 14 to support block 12.

Another feature provided in the preferred embodiment shown in FIG. 3 is the ability to glue a decoration 28 to a ribbon, while not deforming or requiring the removal of prongs 56 formed in decoration 28. A hole or recess 58 is formed in ribbon track 32, so that prongs 56 may penetrate the ribbon and occupy recess 58. Obviously, recess 58 is of less area than ribbon track 32, so that the decoration is suitably supported, and not subjected to being bent or distorted when pressure of the mating parts 12 and 14 is imposed thereon. Prongs 56 thus need not be bent back or removed from decoration 28. Adhesion is performed in the normal way, and prongs 56 are thus protected.

There are no complicated openings or shapes cut into either support block 12 or ribbon holder 14, which reduces complexity and fabrication requirements. All structural features are open to observation, and the correct usage of tool 10 is thereby promoted.

It is to be understood that the present invention is not limited to the sole embodiment described above, but encompasses any and all embodiments within the scope of the following claims.

I claim:

1. A tool for adhering a solid object to a ribbon, comprising:

- a lower support block having means defining a channel and alignment openings therein, there being a channel floor surface and means defining a recess for accepting a die extending below said channel floor surface;
- an upper ribbon holder having a downwardly facing ribbon track member having means defining a square groove therein, for slidably retaining a ribbon therein, and downwardly facing alignment projections alignable and cooperating with said alignment openings;
- a die configured and dimensioned to cooperate with the solid object when the latter is placed face down therein, and also configured and dimensioned to be immovably held in said recess for accepting a die.

2. The tool according to claim 1, wherein said square groove has a width of predetermined dimension slightly smaller than the width of a standard military ribbon, thus gripping the ribbon by friction and opposing spontaneous movement thereby.

3. The tool according to claim 1, wherein said square groove extends longitudinally along said support block.

4. The tool according to claim 1, further including indicia inscribed thereon to assist in gauging a desired location of the decoration with respect to the ribbon.

5. The tool according to claim 1, wherein:

- said upper ribbon holder has a central, planar surface, said ribbon track member and said alignment projections extending downwardly below said central, planar surface; and
- said lower support block has an uppermost, planar surface, said upper ribbon holder central, planar surface abutting said lower support block uppermost, planar surface when pressed together.

6. The tool according to claim 1, wherein:

- said lower support block channel and alignment openings form a common chamber; and
- said ribbon track member and alignment projections are joined.

7. The tool according to claim 1, said downwardly facing ribbon track member having means defining a recess projecting thereinto, said recess being of smaller area than that of said square groove, whereby a decoration is supported on said square groove, and prongs formed in the decoration are protected from bending and distortion when said lower support block and said upper ribbon holder are pressed together while mounting the decoration to a ribbon.

8. The tool according to claim 1, one of said lower support block and said upper ribbon holder having a first short wall, and the other of said lower support block and said upper ribbon holder having a first shoulder cooperating with said first short wall, said lower support block and said upper ribbon holder interfitting and being retained together by friction therebetween.

9. The tool according to claim 1, further including a hollow cap member having a floor panel and walls, one of said cap member and said upper ribbon holder having a second short wall, and the other of said cap member and said upper ribbon holder having a second shoulder, said cap member thus interfitting with said upper ribbon holder, and being retained thereto by friction.

10. A tool for adhering a solid object to a ribbon, comprising:

- a lower support block having means defining therein, there being a channel floor surface and means defining a recess for accepting a die extending below said channel floor surface;
- an upper ribbon holder having a downwardly facing ribbon track member having means defining a square groove therein, for slidably retaining a ribbon therein, and downwardly facing alignment projections alignable and cooperating with said alignment openings;
- a die configured and dimensioned to cooperate with the solid object when the latter is placed face down therein, and also configured and dimensioned to be immovably held in said recess for accepting a die,
- said upper ribbon holder having a central, planar surface, said ribbon track member and said alignment projections extending downwardly below said central, planar surface;
- said lower support block having an uppermost, planar surface, said upper ribbon holder central, planar surface abutting said lower support block uppermost, planar surface when pressed together;
- said lower support block channel and alignment openings forming a common chamber; and
- wherein said ribbon track member and alignment projections are joined.

11. The tool according to claim 10, further including indicia inscribed thereon to assist in gauging a desired location of the decoration with respect to the ribbon.

12. The tool according to claim 10, one of said lower support block and said upper ribbon holder having a first short wall, and the other of said lower support block and said upper ribbon holder having a first shoulder cooperating with said first short wall, said lower support block and said upper ribbon holder interfitting and being retained together by friction therebetween.

13. The tool according to claim 10, further including a hollow cap member having a floor panel and walls, one of said cap member and said upper ribbon holder having a second short wall, and the other of said cap member and said upper ribbon holder having a second shoulder, said cap member thus interfitting with said upper ribbon holder, and being retained thereto by friction.

14. A tool for adhering a solid object to a ribbon, comprising:

a lower support block having means defining therein, there being a channel floor surface and means defining a recess for accepting a die extending below said channel floor surface;

an upper ribbon holder having a downwardly facing ribbon track member having means defining a square groove therein, for slidably retaining a ribbon therein, and downwardly facing alignment projections alignable and cooperating with said alignment openings; and a die configured and dimensioned to cooperate with the solid object when the latter is placed face down therein, and also configured and dimensioned to be immovably held in said recess for accepting a die, said upper ribbon holder having a central, planar surface, said ribbon track member and said alignment projections extending downwardly below said central, planar surface;

said lower support block having an uppermost, planar surface, said upper ribbon holder central, planar surface abutting said lower support block uppermost, planar surface when pressed together;

said lower support block channel and alignment openings forming a common chamber, wherein said ribbon track member and alignment projections are joined;

one of said lower support block and said upper ribbon holder having a first short wall, and the other of said lower support block and said upper ribbon holder having a first shoulder cooperating with said first short wall, said lower support block and said upper ribbon holder interfitting and being retained together by friction therebetween.

15. The tool according to claim 14, further including indicia inscribed thereon to assist in gauging a desired location of the decoration with respect to the ribbon.

16. The tool according to claim 14, further including a hollow cap member having a floor panel and walls, one of said cap member and said upper ribbon holder having a second short wall, and the other of said cap member and said upper ribbon holder having a second shoulder, said cap member thus interfitting with said upper ribbon holder, and being retained thereto by friction.

* * * * *